United States Patent [19]
Davies

[11] 3,825,930
[45] July 23, 1974

[54] RADAR PROVIDED WITH PULSE REPETITION FREQUENCY DISCRIMINATION

[75] Inventor: Eric Davies, Essex, England
[73] Assignee: The Marconi Company Limited, Chelmsford, England
[22] Filed: Dec. 21, 1972
[21] Appl. No.: 317,161

[30] Foreign Application Priority Data
Dec. 23, 1971 Great Britain.................... 60141/71

[52] U.S. Cl. ............................. 343/7.7, 343/17.1 R
[51] Int. Cl............................................. G01s 9/42
[58] Field of Search.............. 343/5 DP, 7.7, 17.1 R

[56] References Cited
UNITED STATES PATENTS
3,213,450  10/1965  Goor............................. 343/17.1 R
3,623,095  11/1971  Gerardin et al..................... 343/7.7
3,680,096  7/1972  Bosc.................................. 343/7.7

Primary Examiner—T. H. Tubbesing
Attorney, Agent, or Firm—Baldwin, Wight & Brown

[57] ABSTRACT

In order to reduce the effect of jamming pulses or spurious noise on the operation of a radar, incoming signals are attenuated to below a threshold level. Only those pulses which on integration over a number of pulse repetition periods exceed the threshold level are utilised. Additional information concerning a radar target is obtained from the degree of alternation to which each incoming signal is subjected in order to bring it below the threshold level.

18 Claims, 4 Drawing Figures

RADAR PROVIDED WITH PULSE REPETITION FREQUENCY DISCRIMINATION

This invention relates to radars and more particularly, although not exclusively, to radars which include a moving target indicator facility. Where two or more radars operate simultaneously each of the radars will receive interfering pulses transmitted by the others, and it is possible that these received pulses could be confused with the echoes received from real targets. This possibility is greatest where the received data is processed automatically by a computer, but even when the received data is displayed visually the interfering pulses cause very serious clutter to be present, making correct interpretation of the display difficult or in some cases impossible.

Figure 1:
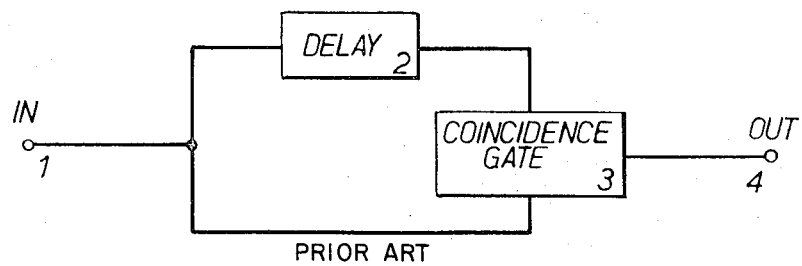

One known arrangement which provides pulse repetition frequency discrimination is shown in FIG. 1, in which received signals (which includes both reflected echoes and interfering pulses) are applied to a terminal 1 and are passed via a delay circuit 2 to one input of a coincidence gate 3, and also directly to a second input of the coincidence gate 3. Delay circuit 2 has a delay equal to the pulse repetition period of the radar such that only echoes having this pulse repetition period are passed to an output terminal 4. In this way pulses originating from other radars and having a different pulse repetition frequency are excluded. This arrangement has the disadvantage that the first echo pulse to be received in any echo pulse sequence is not passed by the coincidence gate 3.

This disadvantage is particularly serious where the pulse repetition frequency discriminator is preceded by a moving target indicator arrangement. Moving target indicator arrangements are well known, and basically pass only those echoes which have been reflected by a moving target. Satisfactory operation of a moving target indicator often requires the use of three delay lines coupled together by suitable feedback loops to optimise clutter rejection and target pass band. As is known, moving target indicators "breed" new pulses, one new pulse being generated for each delay line, and consequently the following pulse repetition frequency discriminator has to be provided with a further delay and associated circuitry for each delay line in the moving target indicator. This results in an extremely expensive pulse repetition frequency discriminator, and additionally the loss of one echo pulse for each delay becomes unacceptable in certain applications.

Figure 2:
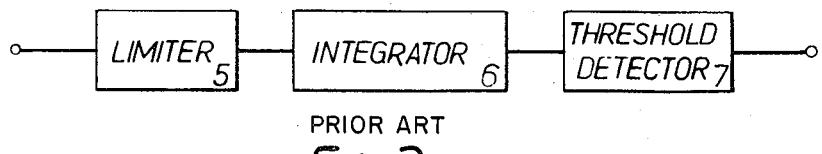

An alternative known pulse repetition discriminator is shown in FIG. 2 in which a limiter 5 is followed by an integrator 6 and a threshold detector 7 respectively. The integrator is arranged such that only recurring echo pulses corresponding to the same range of target are integrated to exceed the threshold of detection. Thus a single interference pulse will not be integrated with other interference pulses unless of course they are harmonically related to the local radar pulse repetition frequency. The limiting level of the limiter 5 is set to a level just less than that of the threshold of the threshold detector 7 such that unless a received pulse is integrated over successive periods it will be rejected.

Unfortunately the use of the limiter also limits the amplitude of echo pulses from a target and removes the characteristic envelope slope of echo signals reflected by the target as the beam scans across it, which characteristic slope itself contains utilisable information concerning the angular position and range of the target. The present invention seeks to provide improved radars in which the foregoing difficulties are reduced.

According to this invention a radar includes pulse receiving means, means for monitoring the amplitude of pulses derived from said pulse receiving means, means controlled by said monitoring means for attenuating said pulses when the said amplitude exceeds a predetermined value, means for generating a signal representative of the degree of attenuation, means for integrating for a particular integration period those pulses of the said pulses occurring at the pulse repetition frequency of the radar, and means for passing only those integrated pulses which exceed a predetermined threshold level to utilisation means, said utilisation means also receiving the said signals representative of the degree of attenuation for those pulses passed to it.

Preferably the attenuation means is preceded by a moving target indicator.

Preferably again each of the received pulses is converted from an analogue signal to a digital code prior to being passed to the moving target indicator. In this case the moving target indicator is digital in nature.

Preferably again the said signal which is representative of the degree of attenuation comprises a digital code to which is added the digital code representative of the attenuated pulse amplitude level. If the amplitude of the pulse does not exceed the said predetermined value, clearly no attenuation will be produced.

Figure 4:
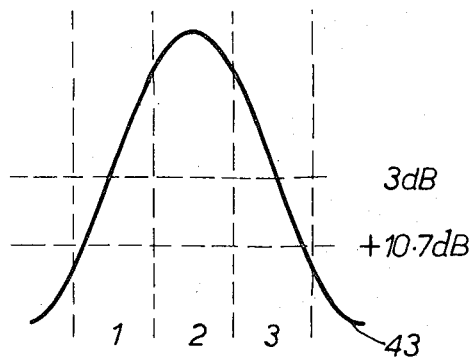
Figure 3:
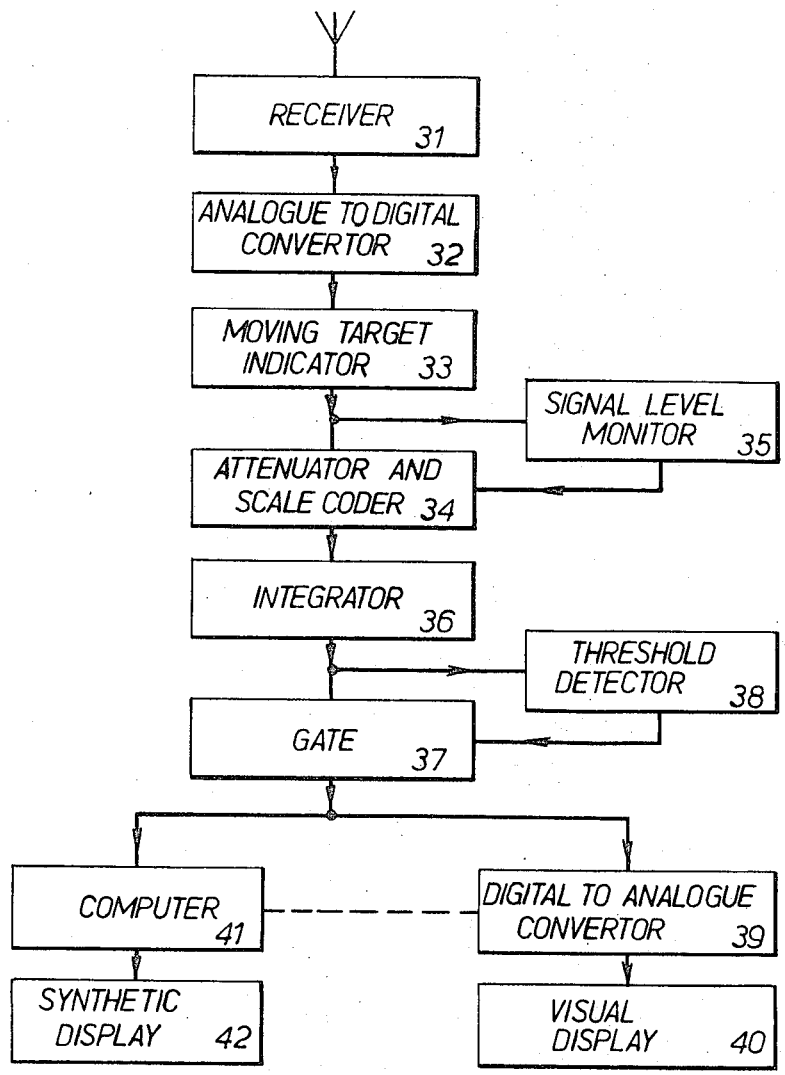

The invention will be further described by way of example with reference to the accompanying drawings in which, FIGS. 1 and 2 show known arrangements, FIG. 3 shows a radar in accordance with the present invention, and FIG. 4 is an explanatory diagram.

Referring to FIG. 3, in which is shown those parts of a radar necessary to the understanding of the present invention, a receiver 31 receives reflected echoes and also interference pulses. Receiver 31 is connected to an analogue-to-digital converter 32 which in turn is connected to a moving target indicator 33. The moving target indicator is connected to an attenuator and scale coder 34 and also to a signal level monitor 35, the output of the level monitor 35 being connected to the attenuator and scale coder 34. Output from the attenuator and scale coder 34 is passed via an integrator 36 to a gate 37 and a threshold detector 38, the threshold detector 38 controlling the operation of the gate 37. Output signals from gate 37 are passed to a digital-to-analogue converter 39 which passes the signals to a visual display 40. Output signals from gate 37 are also passed to a computer 41 and then to a synthetic display 42.

The radar shown in FIG. 3 operates as follows. Pulses received by the radar receiver consist both of echo pulses reflected by a target and of interference pulses from neighbouring radars. The received pulses are passed to the analogue-to-digital converter 32 in which each pulse is assigned a digital code corresponding to the pulse amplitude. Typically the digital code consists of 8 or 9 digits depending on the accuracy required. The sequence of digital codes are passed to the moving target indicator 33 which processes the signals in well known manner to reduce or eliminate "clutter" (echo pulses reflected by stationary or slow moving targets).

The output of the moving target indicator 33 is monitored by the signal level monitor 35 such that when the presence of a digital code is detected which is above the threshold level of the threshold detector 38, the signal level monitor controls the attenuator and scale coder 34 to attenuate by a predetermined amount the amplitude represented by the digital code, and at the same time a scale code is added to the attenuated digital code to indicate the degree of attenuation which it has undergone. The attenuated amplitude code is then passed to the integrator 36 which additively combines successive digital signal codes which occur at the pulse repetition frequency of the radar within a particular integration period. Each digital signal code produced as a result of the integration of the successive digital signal codes is accompanied by a scale code. The successive digital signal codes which are passed to the integrator may each have a different scale code. The first received digital signal code is stored by the integrator together with its scale code (which could be zero). The next received digital signal code is added to the first signal code if the scale codes are the same in each case. If they are not the same, the stored signal and scale codes are modified by the incoming scale code such that the stored signal code is subject to the same effective degree of attenuation as the incoming signal code in order to achieve maximum accuracy for the integrated signal. The codes are then additively combined and are accompanied by the most recently received scale code. This process continues for subsequent digital codes until the end of the integration period is reached. In the case of a zero scale code the presence of a signal code is necessary before any change to stored signal and scale codes is permissible in order to avoid restoring a single interference pulse to its previous magnitude. The integrated digital signal and scale code are then passed to the gate 37 and the threshold detector 38 opens the gate 37 if the last codes in the integration period for the signal or signal and scale codes, exceed the threshold of detection. Since the integration process is only performed on digital codes corresponding to pulses recurring at the pulse repetition frequency of the radar, pulses originating from other radars are not integrated.

When the integrated digital signal and scale codes have an amplitude greater than the threshold level of the threshold detector 38 a gate 37 is opened, and the integrated signal code and its scale code are passed to the computer 41 and the digital-to-analogue converter 39. The threshold detector at the end of an integration period responds to the integrated digital signal code and scale code at the predetermined signal to noise ratio chosen to give the desired Probability of Detection and False Alarm Rate for the smallest target at maximum range.

The digital-to-analogue converter 39 converts the integrated digital code, as modified by its scale code, into an analogue signal which is passed to a visual display 40 which could conveniently be a plan position indicator. The integrated digital code and the scale code are also passed to a computer 41 which then utilises the integrated digital signal and scale codes to obtain a ratio of signal energy in two or more contiguous integration periods so that the angular position of a target can be computed to within a small fraction of a beam width. This information may be displayed on a synthetic display of any convenient nature, and may also be passed to the digital-to-analogue converter so that only the peak of the received signals are displayed on the visual display 40. This reduces the extent of the area occupied by a target on the display and enables its exact position to be more accurately seen.

The operation of the present invention is further explained with reference to FIG. 4 which shows the amplitude distribution of echo pulses which are received from a single target as it is scanned by the radar beam. The amplitude of the pulses rises as the radar beam begins to receive echo pulses, reaches a maximum when the target is in the axis of the beam, and falls away as the beam passes away from the target. The substantially Gaussian envelope of the pulse amplitudes, derived by appropriate weighting factors applied to the individual elements of the receiving array to minimise side-lobes, is given by the solid line 43. The vertical broken lines indicate the boundaries of successive integration periods, periods designated I1, I2 and I3 are shown, each period containing thirteen echo pulses, the first and last pulses of which are shared with adjacent integration periods. The -3dB level is shown by a broken line, and it is assumed that not less than twenty-five echo pulses, i.e., two complete integration periods occur during the time for which the envelope 43 exceeds the -3dB level. The signal level monitor 35 is arranged to commence attenuation at the 10.7 dB S/N ratio (signal to noise ratio) level shown on FIG. 4, and to provide attenuation in 6 dB steps, and to add the scaling code appropriate to the degree of attenuation. The threshold detector is arranged to pass signals having an amplitude greater than 13 dB S/N.

These figures are derived from calculations related to a Gaussian pulse train envelope so that interpolation between the integrated periods will be accurate to within 0.1 of a beamwidth if the minimum number of echo pulses in the 3dB beamwidth is not less than 25. The accuracy of 0.1 of a beamwidth is arbitrary, but has been chosen as providing an acceptable degree of accuracy. Greater accuracy can be obtained by raising the Threshold of Detection Level above 13 dB S/N ratio, or increasing the number of pulses in the -3dB peak of the beam. The threshold detector level has been set at 13 dB S/N in order to provide a satisfactory probability of detection and false alarm rate for this accuracy.

It has been calculated that for a particular M.T.I. a single interference pulse S/N ratio at the M.T.I. output must not exceed 11.35 dB if the detection threshold level after integration is 13 dB S/N. Consequently attenuation must be introduced before this level is reached.

However it has also been calculated that the minimum level at which a wanted echo target can be attenuated by a step of 6 dB of the signal is about 10.1 dB. Thus an attenuation threshold has been chosen at 10.7 dB S/N which is approximately midway between the 10.1 dB S/N and 11.35 dB S/N levels. When a pulse amplitude exceeds this level of 10.7 dB S/N it is attenuated by 6 dB, and a scale code generated which then accompanies the digital code representative of the attenuated pulse amplitude to indicate that the attenuation has taken place. The preferred step of attenuation is 6 dB for the combination of two integration periods in the 3dB beamwidth embracing a minimum of 25 pulses, but if desired some other step could be used, as could alternative integration periods, numbers of pulses and detection threshold level.

I claim:

1. A radar including pulse receiving means, means for monitoring the amplitude of pulses derived from said pulse receiving means, means controlled by said monitoring means for attenuating said pulses when the said amplitude exceeds a predetermined value, means for generating a signal representative of the degree of attenuation, means for integrating for a particular integration period those pulses of the said pulses occurring at the pulse repetition frequency of the radar, and means for passing only those integrated pulses which exceed a predetermined threshold level to utilisation means, said utilisation means also receiving the said signals representative of the degree of attenuation for those pulses passed to it.

2. A radar as claimed in claim 1 wherein the attenuation means is preceded by a moving target indicator.

3. A radar as claimed in claim 2 wherein the moving target indicator is preceded by converter means operative to generate digital codes representative of the amplitude of the pulses derived from said pulse receiving means.

4. A radar as claimed in claim 3 wherein the means for generating a signal representative of the degree of attenuation is operative to append to the digital code representative of the amplitude of the attenuated pulses a further digital code representative of the degree of attenuation.

5. A radar system comprising, in combination:
pulse receiving means for receiving echo pulses which are received from a target as the target is scanned by a radar beam of selected prf and having an output which may include interference pulses;

integrating means for integrating successive pulses received thereby at said selected prf for each of a plurality of successive particular integration periods and having an output at the end of each period which is the additive combination of each successive pulses during each such period;

attenuator means connecting said output of the pulse receiving means to said integrating means for selectively stepwise attenuating pulses passed to said integrating means;

monitoring means connected to the output of said pulse receiving means for monitoring the amplitudes of the pulses at the output of said pulse receiving means and connected to said attenuator means to cause stepwise attenuation thereby in response to pulse output amplitude from said pulse receiving means which exceeds a first predetermined limit;

utilization means for displaying information derived from the output of said integrator means;

gate means connecting the output of said integrator means to said utilization means for selectively passing the output of said integrator means to said utilization means; and threshold detector means connected to the output of said integrator means and to said gate means for opening said gate means in response to an output of said integrator means which exceeds a second predetermined limit which is greater than said first predetermined limit.

6. A radar system as defined in claim 5 wherein said pulse receiving means includes an analog-to-digital converter which converts amplitudes of said echo pulses to $k$-bit digital words and wherein said attenuator means produces an $n$-bit output where $n > k$ and where $k$ of said $n$ bits represent amplitude while remaining bits represent the level of attenuation.

7. A radar system as defined in claim 6 wherein said pulse receiving means also includes a moving target indicator preceeding said attenuator means.

8. A radar system as defined in claim 7 wherein said integrating means produces at least two complete integration periods during the time for which the envelope of echo pulses exceeds the level of -3dB from peak amplitude thereof.

9. A radar system as defined in claim 8 wherein said first predetermined limit to which said monitoring means responds in less than said -3dB level.

10. A radar system as defined in claim 9 wherein said integration periods each encompass a whole number of echo pulses.

11. A radar system as defined in claim 7 wherein said integrating means produces at least two complete integration periods during the time for which the envelope of echo pulses exceeds the level of -3dB from peak amplitude thereof.

12. A radar system as defined in claim 11 wherein said first predetermined limit to which said monitoring means responds is less than said -3dB level.

13. A radar system as defined in claim 12 wherein said integration periods each encompass a whole number of echo pulses.

14. A radar system as defined in claim 6 wherein said integrating means produces at least two complete integration periods during the time for which the envelope of echo pulses exceeds the level of -3dB from peak amplitude thereof.

15. A radar system as defined in claim 14 wherein said first predetermined limit to which said monitoring means responds is less than said -3dB level.

16. A radar system as defined in claim 15 wherein said integration periods each encompass a whole number of echo pulses.

17. A radar system as defined in claim 6 wherein said integration periods each encompass a whole number of echo pulses.

18. A radar system as defined in claim 5 wherein said integration periods each encompass a whole number of echo pulses.

* * * * *